(12) United States Patent
Tanaka et al.

(10) Patent No.: US 7,075,456 B2
(45) Date of Patent: Jul. 11, 2006

(54) PARKING ASSIST DEVICE

(75) Inventors: Yuu Tanaka, Aichi-gun (JP);
Yoshifumi Iwata, Anjo (JP); Hideyuki Iwakiri, Tajimi (JP); Hisashi Satonaka, Susono (JP); Yuichi Kubota, Okazaki (JP); Tomohiko Endo, Toyota (JP); Akira Matsui, Toyota (JP); Toru Sugiyama, Toyota (JP); Seiji Kawakami, Susono (JP); Katsuhiko Iwazaki, Suntou-gun (JP); Hiroaki Kataoka, Susono (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/928,255

(22) Filed: Aug. 30, 2004

(65) Prior Publication Data
US 2005/0057374 A1 Mar. 17, 2005

(30) Foreign Application Priority Data
Aug. 29, 2003 (JP) ............................. 2003-209742

(51) Int. Cl.
*G08G 1/14* (2006.01)

(52) U.S. Cl. ..................................... 340/932.2; 701/41
(58) Field of Classification Search ............ 340/932.2; 701/41–44; 180/271
See application file for complete search history.

(56) References Cited

U.S. PATENT DOCUMENTS

| | | | |
|---|---|---|---|
| 6,170,591 B1* | 1/2001 | Sakai et al. | 180/204 |
| 6,186,259 B1* | 2/2001 | Shimizu et al. | 701/42 |
| 6,487,481 B1* | 11/2002 | Tanaka et al. | 701/41 |
| 6,704,653 B1* | 3/2004 | Kuriya et al. | 701/301 |
| 6,778,891 B1* | 8/2004 | Tanaka et al. | 701/41 |
| 2005/0049766 A1* | 3/2005 | Tanaka et al. | 701/36 |
| 2005/0055139 A1* | 3/2005 | Tanaka et al. | 701/1 |

FOREIGN PATENT DOCUMENTS

| | | |
|---|---|---|
| DE | 101 20 511 A1 | 6/2002 |
| EP | 1 065 642 A2 | 1/2001 |
| EP | 1 327 559 A1 | 7/2003 |
| JP | 11-208420 A2 | 8/1999 |

* cited by examiner

*Primary Examiner*—Thomas Mullen
(74) *Attorney, Agent, or Firm*—Sughrue Mion, PLLC

(57) ABSTRACT

A parking assist device includes a leading path generation judging device for judging whether an effective leading path to a target parking position is generated. According to the parking assist device, a parking assist for leading a vehicle to the target parking position is conducted in accordance with a judged result of the leading path generation judging device. The leading path generation judging device includes a first judging device for judging whether the leading path is generated when an initial steering angle of the vehicle is determined as a steering angle initial value, and a second judging device for judging whether the leading path is generated when a steering angle other than the initial steering angle is determined as the steering angle initial value in case it is judged that the leading path is not generated by the first judging device.

12 Claims, 7 Drawing Sheets

US 7,075,456 B2

PARKING ASSIST DEVICE

CROSS REFERENCE TO RELATED APPLICATIONS

This application is based on and claims priority under 35 U.S.C. §119 with respect to Japanese Patent Application No. 2003-209742 filed on Aug. 29, 2003, the entire content of which is incorporated herein by reference.

FIELD OF THE INVENTION

The present invention relates to a parking assist device. More particularly, the present invention pertains to a parking assist device for leading a vehicle to a target parking position in case an effective leading path to the target parking position is generated.

BACKGROUND

A known parking assist device described in Japanese Patent Laid-Open Publication No. H11-208420 displays a target parking position designation display so that an operator designates a target parking position of a vehicle on a screen showing an image of the vehicle surroundings by a positional operation of the target parking position designation display on the screen. With the known parking assist device described in Japanese Patent Laid-Open Publication No. H11-208420, in case the designated leading path to the target parking position is generated by the calculation, it is judged that the parking to the target parking position is available to lead the vehicle to the target parking position along the generated leading path. In case the leading path to the target parking position is not generated by the calculation, it is judged that the parking to the target parking position is unavailable, and the transaction to lead the vehicle is not conducted.

As foregoing, with the known parking assist device described in Japanese Patent Laid-Open Publication No. H11-208420, the availability of the parking to the designated target parking position is judged based on the availability of the leading path to the target parking position. In this case, the leading path is calculated using a neutral position at which the steering angle is defined zero or an actual steering angle at the time as a steering angle initial value of the vehicle at a start of the leading. Notwithstanding, because the foregoing calculation method limits the range of the leading path to be effectively generated, in practice, it is judged that the effective leading path is not generated and that the parking to the target parking position is difficult or impossible even when the parking to the target parking position is available by slightly changing the steering angle initial value.

A need thus exists for a parking assist device which expands the available range of a leading starting position for parking a vehicle to a target parking position.

SUMMARY OF THE INVENTION

In light of the foregoing, the present invention provides a parking assist device, which includes a leading path generation judging means for judging whether an effective leading path to a target parking position is generated. According to the parking assist device, a parking assist for leading a vehicle to the target parking position is conducted in accordance with a judged result of the leading path generation judging means. The leading path generation judging means includes a first judging means for judging whether the leading path is generated when an initial steering angle of the vehicle is determined as a steering angle initial value, and a second judging means for judging whether the leading path is generated when a steering angle other than the initial steering angle is determined as the steering angle initial value in case it is judged that the leading path is not generated by the first judging means.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
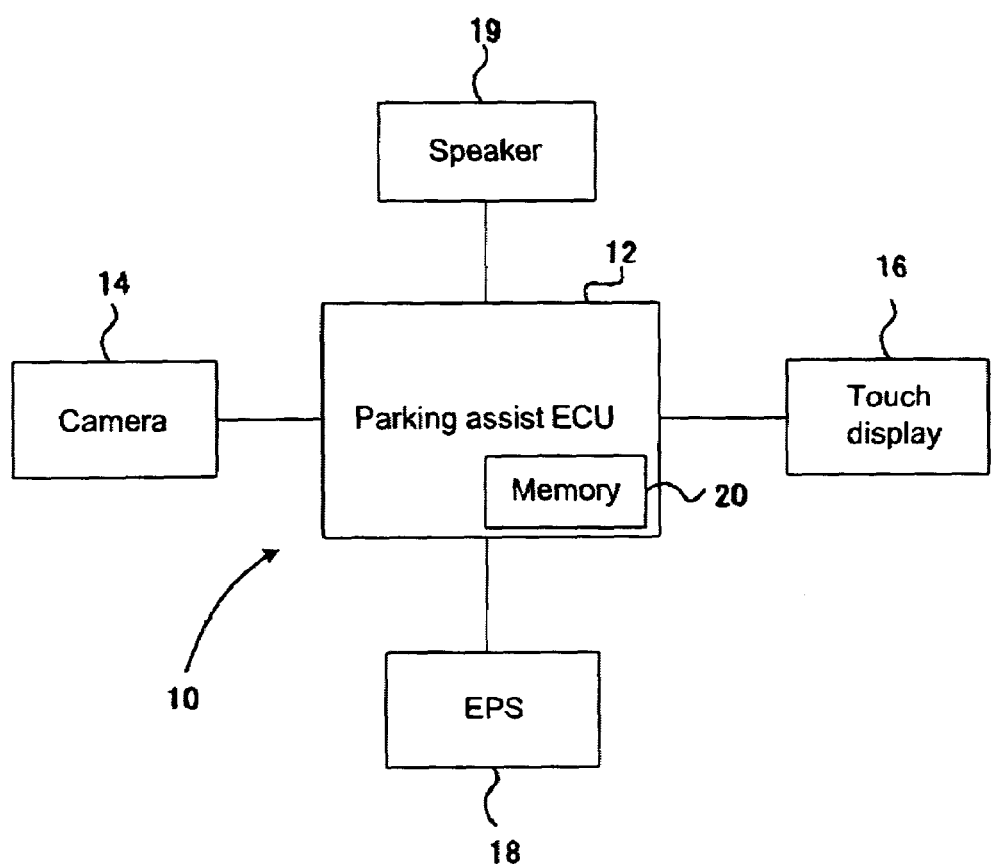
FIG. 1 is a system diagram of a parking assist device mounted on a vehicle according to an embodiment of the present invention.

One embodiment of the present invention will be explained with reference to the illustrations of the drawing figures as follows.

A parking assist device 10 shown in FIG. 1 is configured to automatically carry out the vehicle steering so that the vehicle moves along a leading path to a target parking position where the vehicle is to be parked on a road surface without the manual steering operation by an operator when parking the vehicle such as for back in parking and for parallel parking. The leading control to the target parking position by the parking assist device 10 is refereed to as a parking assist control hereinafter.

As shown in FIG. 1, the parking assist device 10 includes parking assist electronic control unit (i.e., referred as a parking assist ECU hereinafter) 12 for controlling the parking assist device 10. The parking assist ECU 12 is connected with a camera 14. The camera 14 is positioned at the central rear portion of the vehicle to capture an image of the region extended in a predetermined range rearward of the vehicle. The image information of the vehicle rearward surroundings captured by the camera 14 is supplied to the parking assist ECU 12.

The parking assist ECU 12 is connected with a touch display 16. The touch display 16 is provided at a position where the vehicle operator can see and operate (e.g., the center of an instrument panel). The parking assist ECU 12 sends the command so that the actual image captured by the camera 14 is displayed on the touch display 16, for example, in case the vehicle shift position is set for reverse. The touch display 16 shows the vehicle rearward surroundings captured by the camera 14 on the screen following the command of the parking assist ECU 12. The touch display 16 displays additional lines and frames, or the like, for the parking assist control overlapping on the actual image captured by the camera 14 following the command of the parking assist ECU 12.

The touch display 16 includes a touch operation portion constructed as pressure sensitive type or temperature sensitive type, or the like, to be operable by the vehicle operator. The touch operation portion includes plural hierarchical switches which are displayed on the screen following the command from the parking assist ECU 12. The parking assist ECU 12 detects the operation of the touch operation portion by the vehicle operator to carry out the transaction in accordance with the contents of the selected operation. The touch operation portion includes a switch for starting the back in parking mode for the parking assist control, a switch for starting the parallel parking mode for the parking assist control, and arrow button switches for designating the target parking position to park the vehicle, or the like.

The parking assist ECU 12 is connected to an electric power steering device (i.e., hereinafter referred as EPS) 18. The EPS 18 includes a torque sensor for detecting a steering torque applied to a steering shaft by the steering operation by the vehicle operator, a steering angle sensor for detecting the steering angle of the steering shaft, and an electric motor for applying torque to the steering shaft. The EPS 18 activates the electric motor to generate torque to assist the steering torque in the steering operation by the operator and also activates the electric motor to generate torque for steering the vehicle without an accompanying steering operation by the operator when parking the vehicle such as for back in parking and for parallel parking, or the like, in accordance with the parking assist control.

The EPS 18 supplies the detected steering angle information of the steering shaft to the parking assist ECU 12. The parking assist ECU 12 supplies a target steering angle which is to be achieved by the steering shaft at the parking assist control to the EPS 18. The EPS 18 makes the electric motor generate the torque for the parking assist control referring to the target steering angle supplied from the parking assist ECU 12.

The parking assist ECU 12 is further connected to a speaker 19. The speaker 19 outputs a voice message to the occupants following the command of the parking assist ECU 12. The parking assist ECU 12 commands the speaker 19 to output the appropriate voice message at an appropriate timing.

The parking assist ECU 12 includes a memory 20 configured to read and write the data. The memory 20 memorizes the positional information of the target parking position determined by the operator and the path information of the leading path to the target parking position generated by calculation. The information memorized in the memory 20 is deleted when the parking assist control is completed such as when the shift position is transited from the reverse position to the parking position, or the neutral position, or the like, and when the vehicle approaches approximate to the target parking position, or the like.

The operation of the parking assist device 10 will be explained as follows.

According to the embodiment of the present invention, first, the operator stops the vehicle at a position having a predetermined distance relative to the target parking position to park the vehicle with the steering angle at a neutral positional state (i.e., zero steering angle). When the shift position of the vehicle is changed to the reverse position, the vehicle rearward surroundings captured by the camera 14 are shown on the screen of the touch display 16 either automatically or when the a predetermined switch for requesting the parking assist by the parking assist control is ON. In this case, a switch for starting the back in parking starting mode and the switch for starting the parallel parking mode for the parking assist control appear on the screen (i.e., initial screen image).

When the back in parking mode switch is operated in the foregoing state, a frame (hereinafter referred as parking space frame) S showing the target parking position where the vehicle is to be parked by the back in parking on the road surface and arrow button switch C configured to be moved and rotated for adjusting the target parking position on the road surface are displayed overlapping on the vehicle rearward surroundings captured by the camera 14 on the screen of the touch display 16 (i.e., setting screen image).

In this case, the arrow button switch C includes an upward switch for moving the target parking position further on the road surface relative to the vehicle, a downward switch for moving the target parking position to the nearer relative to the vehicle, a leftward switch for moving the target parking position to the left relative to the vehicle, a rightward switch for moving the target parking position to the right relative to the vehicle, a counterclockwise switch for rotating the target parking position counterclockwise relative to the vehicle, and a clockwise switch for rotating the target parking position clockwise relative to the vehicle. With the foregoing construction, the target parking position is movable in four arbitrary directions and rotatable about the center via the positional operation on the display screen of the parking space frame S.

When the parallel parking mode switch is operated on the screen of the touch display 16, the parking space frame S showing the target parking position where the vehicle is to be parked on the road surface by the parallel parking and the arrow button switch C for moving the target parking position on the road surface are displayed overlapping on the vehicle rearward surroundings captured by the camera 14 on the screen of the touch display 16 (i.e., setting screen image).

In this case, the upward switch, the downward switch, the leftward switch, and the rightward switch are shown as the arrow button switch C. In the meantime, the counterclockwise switch and the clockwise switch are not shown. With the foregoing construction, although the target parking position is arbitrarily movable in the four directions by the positional operation of the parking space frame S on the screen to move in the back-and-forth directions and the vehicle width directions, the target parking position does not rotate about the center.

An initial display position of the parking space frame S may be a constant position on the screen that a default position which is at a predetermined relative positional relationship with the vehicle position is defined as the initial position of the target parking position, or may be a position on the screen corresponding to the initial position of the target parking position which is determined before that time. The parking space frame S corresponds to the target parking position on the actual road surface, thus the parking space frame S is configured to be rectangular having the approximately the same size with the vehicle size provided that the parking space frame S is projected on the actual road surface. However, on the screen of the touch display 16, the parking space frame S is configured to have the configuration corresponding to the position on the vehicle rearward image (i.e., on the camera coordinate) captured by the camera 14 shown on the screen.

When the arrow button switch C is operated by the operator, the target parking position moves by X cm (e.g., 5 cm) on the actual road surface, rotates by Y degrees (e.g., 1 degree) per a touch to displace the parking space frame S on the screen of the touch display 16. The closer the target parking position is relative to the vehicle, the larger the moving amount of the parking space frame S on the screen of the touch display 16 considering the distance relationship on the vehicle rear image captured by the camera 14.

After the parking space frame S and the arrow button switch C are displayed on the screen of the touch display 16, the calculation of the leading path from the current vehicle position at the time serving as the leading starting position to the target parking position following the operational position of the parking space frame S is conducted every predetermined time (e.g., 2 ms).

Figure 2A:
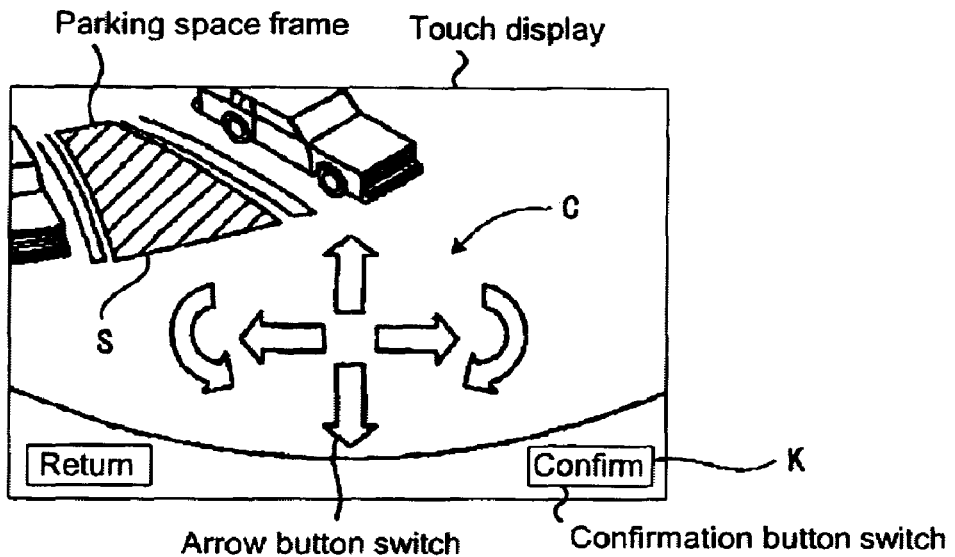
FIG. 2A is an image shown on a screen when a target parking position is designated at the parking assist device for back in parking according to the embodiment of the present invention.
Figure 2B:
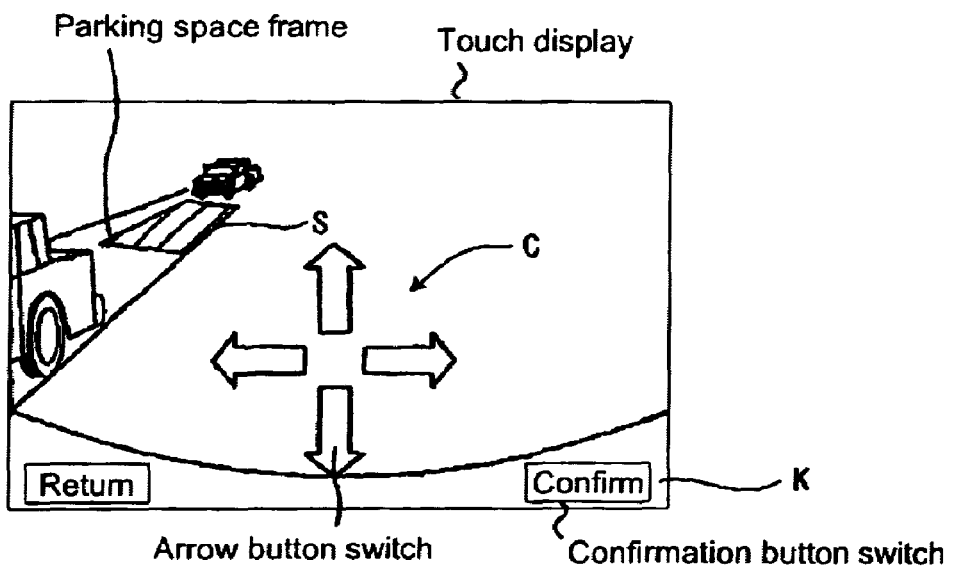
FIG. 2B is an image shown on a screen when a target parking position is designated at the parking assist device for parallel parking according to the embodiment of the present invention.

When the back in parking mode switch or the parallel parking mode switch is operated, a confirmation button switch K for confirming the setting of the target parking position is overlapped on the screen along with the parking space frame S and the arrow button switch C as shown in FIGS. 2A–2B. When the confirmation buttons switch K is operated at the state that the leading path to the target parking position is generated by the calculation, the designation of the target parking position is confirmed, thus allowing the automatic steering operation by the parking assist control thereafter.

Figure 3:
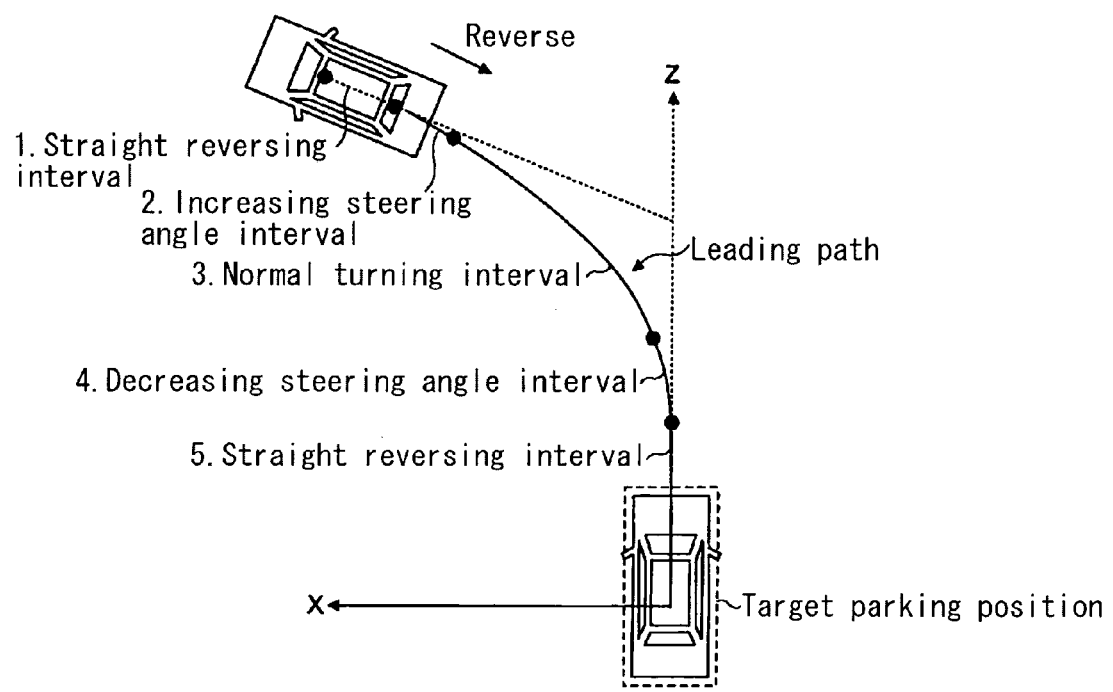
FIG. 3 is a view showing a path to the target parking position for back in parking.

As shown in FIG. 3, with the back in parking mode, the calculation of the leading path to the target parking position at the initial designation is conducted based on a relative positional relationship between the current position of the vehicle and the target parking position when a predetermined geometric positional condition determined by the relative positional relationships between the current position of the vehicle and the target parking position and a minimum turning radius of the vehicle is satisfied so that the following each interval is appropriately formed in the following order: 1. Straight reversing interval of a predetermined distance; 2. Increasing steering angle interval by Clothoid curve; 3. Normal turning interval with the fixed steering angle; 4. Decreasing steering angle interval by Clothoid curve; and 5. Straight reversing interval by a predetermined distance. In this case, the vehicle longitudinal direction at the target parking position is defined as a Z-axis direction and the vehicle width direction, that is, the direction perpendicular to the Z-axis direction is defined as an X-axis direction. The coordinate (X, Z) of the target parking position on the road surface is defined as zero (i.e., (X, Z)=(0, 0)). The leading starting position is positioned in the positive region of the both X coordinate and Z coordinate.

Figure 4:
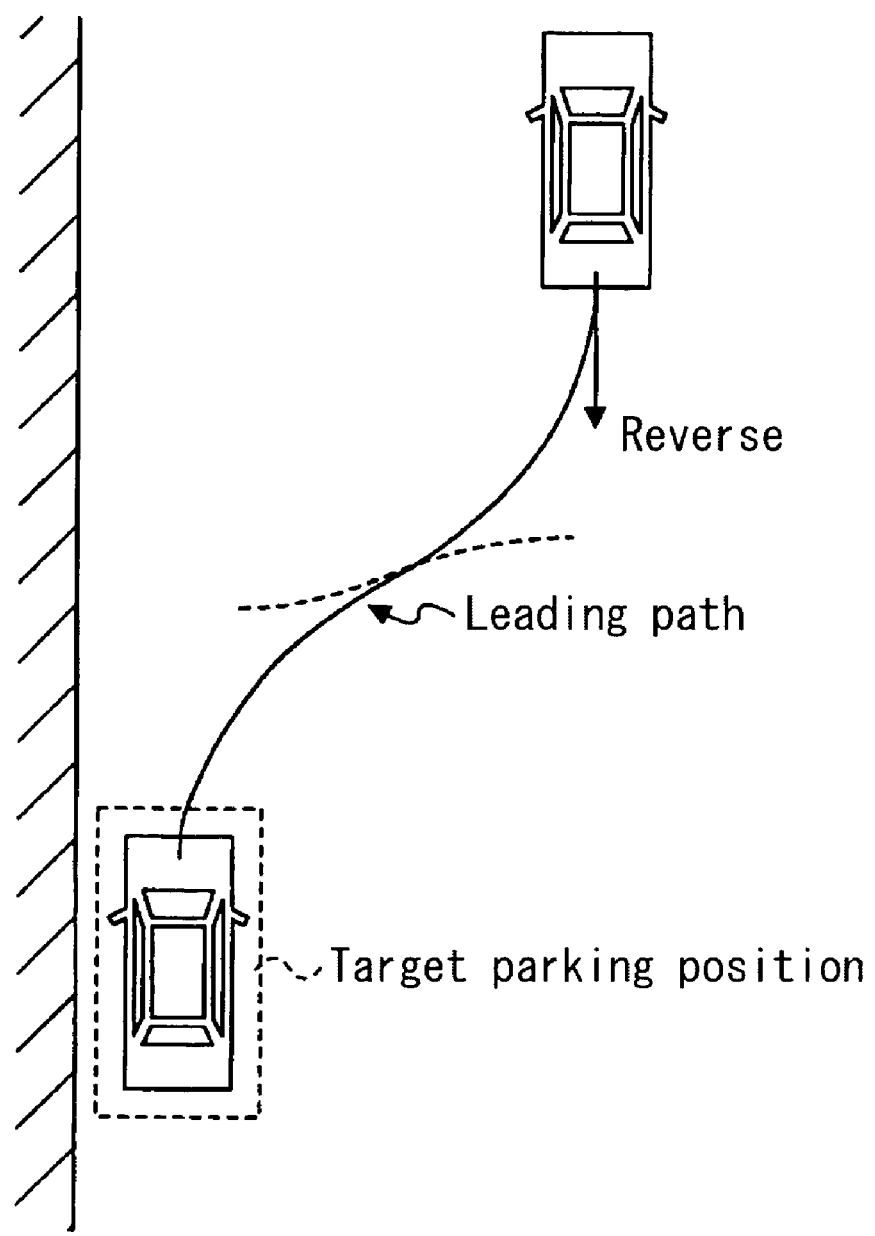
FIG. 4 is a view showing a path to the target parking position for parallel parking.

As shown in FIG. 4, with the parallel parking, when predetermined geometric positional conditions defined by a minimum turning radius of the vehicle and a relative positional relationship between the current position of the vehicle and the target parking position are satisfied, the calculation of the leading path to the target parking position at the initial designation is conducted based on the relative positional relationship so that portions of two imaginary circles serving as the path are tangent to each other.

When the leading path to the target parking position is calculated at the back in parking mode and the parallel parking mode to effectively generate the leading path so that the vehicle actually travels, the inside of the parking space frame S is colored, for example, in green to show that the parking assist control can be performed on the touch display 16. When the effective path to the target parking position is generated and the confirmation button switch K on the touch display 16 is operated with the green colored parking space frame S, the target parking position information and the path information are memorized in the memory 20, and the arrow button switch C and the confirmation switch K disappear.

On the other hand, in case the effective path to the target parking position is not generated by the calculation because the relative position between the vehicle and the target parking position does not satisfy the predetermined relationship, or the like, the inside of the parking space frame S is colored, for example, in red to show that the parking assist control cannot be performed and the arrow button switch C and the confirmation button switch K are maintained to be displayed to urge the change of the target parking position or the leading starting position.

When the vehicle starts to be in reverse motion due to the creep, or the like, by releasing the braking operation at the state that effective path to the target parking position is generated and the designation of the target parking position is completed by the operation of the confirmation button switch K on the touch display 16, the parking assist control for leading the vehicle to the target parking position starts thereafter. Particularly, the vehicle moving amount from the leading starting position relative to the road surface is calculated, the vehicle position relative to the path to the generated target parking position is calculated based on the calculated vehicle moving amount and the steering angle information from the EPS 18, and the target steering angle for moving the vehicle along the generated path is calculated. The calculated target steering angle is supplied to the EPS 18. The EPS 18 makes the electric motor generate the torque for rotating the steering shaft to move the vehicle along the generated path based on the target steering angle from the parking assist ECU 12.

With the construction of the embodiment of the present invention, the parking assist control can be carried out for automatically operating the vehicle along the predetermined path to the target parking position determined by the operation of the vehicle operator for back in parking or for parallel parking. Once the foregoing parking assist control is carried out, it is not required for the operator to conduct the steering operation. Thus, with the parking assist device 10, the burden of the operator for the steering operation can be reduced for back in parking and for parallel parking.

When the vehicle moves rearward at a state where the effective path to the target parking position is generated and where the target parking position is set, the moving amount of the vehicle is calculated and a cancel button switch for canceling the parking assist control to the target parking position and a change button switch for achieving the resetting of the target parking position, in other words, the change of the vehicle target parking position from the position designated when the button is pressed to another position are displayed on the screen of the touch display 16. It is preferable that the change button switch operates when the vehicle is at a stopped state.

In case the change button switch is not operated, the parking assist control based on the target parking position information and the path information in the memory 20 is carried out. On the other hand, in case the change button switch is operated, the setting screen as shown in FIG. 2 reappears on the screen of the touch display 16 to show the arrow button switch C, the parking space frame S without color, and the confirmation button switch K. When the foregoing state is achieved, the leading path to the target parking position is calculated per predetermined time again following the operational position of the parking space frame S from the initial position defined as the leading starting position at the current position of the vehicle at the time.

The calculation of the leading path to the target parking position at the re-designation is conducted base on the relative positional relationship among the steering angle at the re-designation, the current position, and the target parking position when the conditions different from the condition at the leading path calculation at the initial designation is satisfied. Thereafter, likewise at the initial designation, the transaction in accordance with the availability of the path generation is conducted. Thereafter, the transaction is carried out likewise every time the change button switch is operated.

When the cancel button switch is operated, the parking assist control to the target parking position designated at the time is canceled to cancel the leading guide of the vehicle. Further, in case the disturbance relative to the parking assist control is generated such as the intervening operation conducted by the steering operation by the operator, the vehicle speed exceeding a predetermined speed, and the operation of the parking brake during the parking assist control after the start of the leading guide of the vehicle, the parking assist control is canceled to cancel the leading guide of the vehicle to ensure the safety during the leading and to securely lead the vehicle along the locus of the generated path.

At the back in parking mode, the calculation of the leading path to the target parking position is conducted to form each interval including the following interval in order: 1. Straight reversing interval; 2. Increasing steering angle interval 3. Normal turning interval; 4. Decreasing steering angle interval; and 5. Straight reversing interval. The foregoing calculation for the path is conducted premising that the steering angle at the initial leading stage (i.e., steering angle initial value) is at the neutral positional state with zero steering angle. With the foregoing calculation method, it is required that a predetermined distance in the perpendicular direction relative to the target parking position at the leading starting position (i.e., X-axis direction of FIG. 3) is ensured in order to effectively generate the leading path from the leading starting position to the target parking position so that the vehicle actually travels. Thus, in case the calculation of the leading path is conducted premising that the steering angle initial value is always zero, the effective leading path is not generated when the distance in the perpendicular direction of the leading starting position is shorter than the predetermined distance, which limits the range of the leading starting position for effectively generating the leading path to the target parking position.

To the contrary, by the calculation of the leading path premising that the steering angle at the initial leading stage is steered leftward or rightward (i.e., different from the neutral positional state), it is not necessary to determine the distance to be long to some extent in the perpendicular direction relative to the target parking position of the leading starting position for generating the effective leading path. In other words, the effective leading path can be generated even if the distance in the perpendicular direction is shorter than the predetermined distance. In this case, the distance in the perpendicular direction for generating the effective leading path assumes the shortest when the maximum allowable steering angle allowed at the vehicle with the steering wheel maximally steered is determined as the steering angle initial value serving as the leading initial steering angle.

With the parking assist device of the embodiment of the present invention, the probability for generating the effective leading path at the calculation of the leading path from the leading starting position to the target parking position is increased to expand the range for parking to the target parking position.

Figure 5:
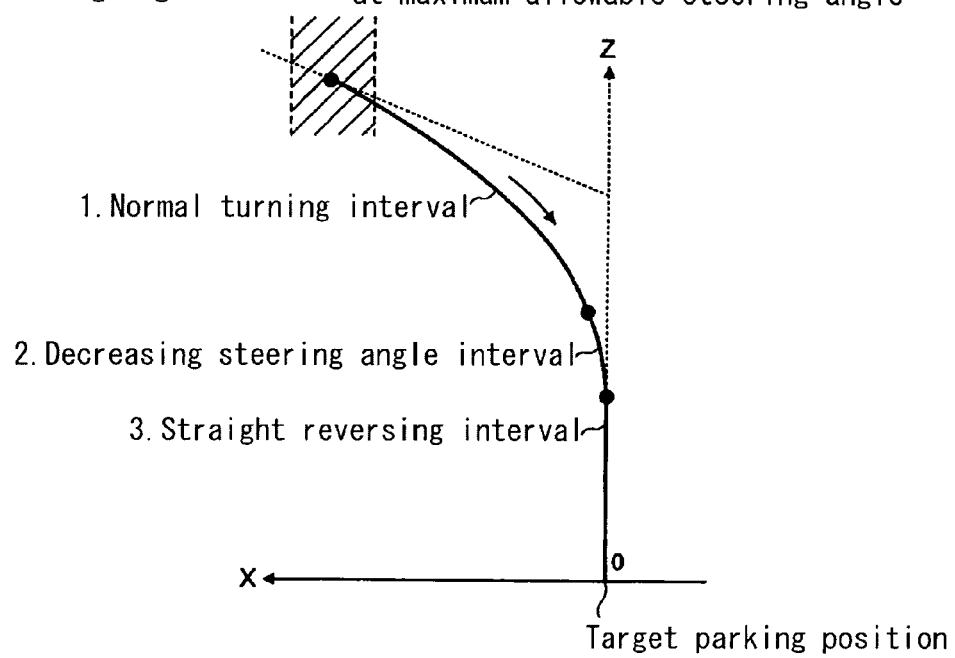
FIG. 5 is an explanatory view for calculating a leading path to the target parking position with the parking assist device according to the embodiment of the present invention.

As shown in FIG. 5, with the parking assist device 10, the calculation of the leading path from the leading starting position to the target parking position is conducted by assuming the steering angle initial value at the neutral positional state for back in parking mode. In case the effective leading path is generated as the result, thereafter, the inside of the parking space frame S is colored in green, or the like, on the screen of the touch display 16 to show that the parking assist control is to be performed to the operator to allow the parking assist control.

On the other hand, in case the leading path based on the steering angle initial value with the zero steering angle is not effectively generated, a prediction locus from the leading starting position to a position where the vehicle is assumed to be in parallel with the target parking position is calculated by determining the steering initial value to be the maximum allowable steering angle of the vehicle. The prediction locus is formed by appropriately forming each interval in order: 1. Normal turning interval at the maximum allowable steering angle; 2. Decreasing steering angle interval determined by Clothoid curve; and 3. Straight reversing interval.

As shown in FIG. 6, with the parking assist device 10, the displacement amount of the prediction locus which is calculated based on the steering angle initial value of the maximum allowable steering angle in the X-axis direction from the leading starting position to the position where the vehicle is assumed to be in parallel with the target parking position fluctuates in accordance with the deflection angle at the leading starting position relative to the vehicle target parking position. Thus, the calculation of the prediction locus is performed on a case-by-case basis.

Figure 6A:
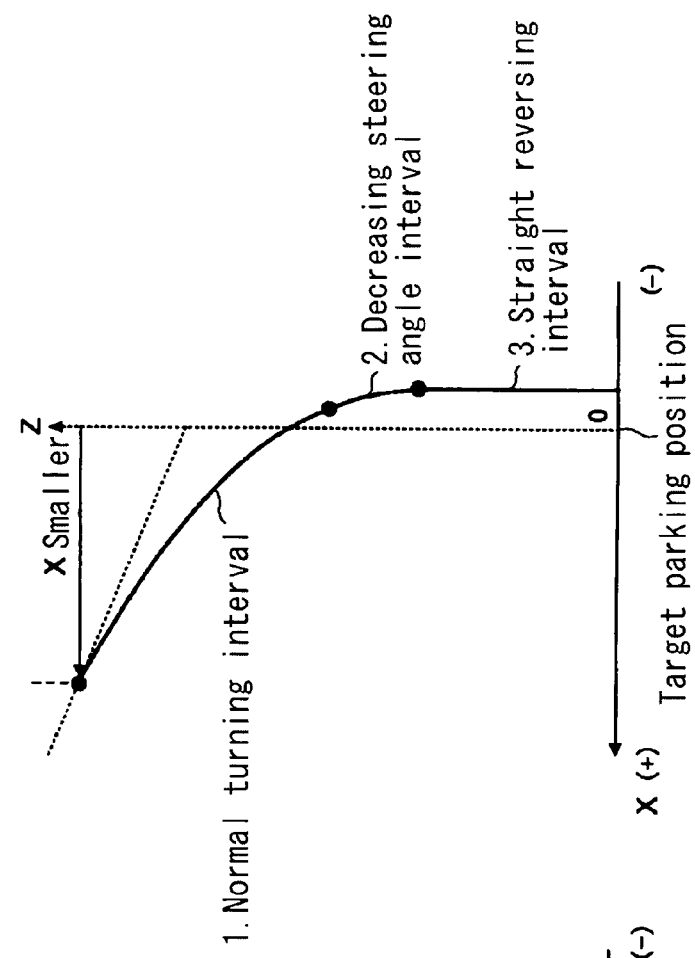
FIGS. 6A–6B are explanatory views for a method for judging whether the effective leading path from a leading starting position to the target parking position is generated when a steering angle initial value is not at zero steering angles.
Figure 6B:
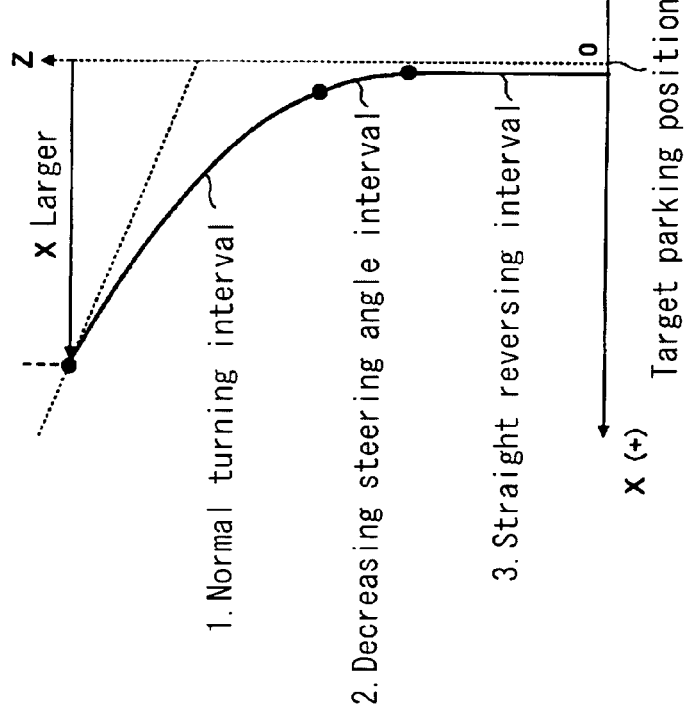

As foregoing, when the coordinate at the target parking position is determined to be (X, Z)=(0, 0) and the leading starting position is within the positive region for both the X coordinate and the Z coordinate, and when the X coordinate of the position (i.e., terminal end position) where the vehicle is assumed to be in parallel with the target parking position on the prediction locus as the result of the prediction locus calculation exceeds the X coordinate position "zero" of the target parking position as shown in FIG. 6B, that is the negative value, it is judged that the steering angle for generating the effective leading path to the target parking position does not exist between the zero steering angle and the maximum allowing steering angle because the distance of the leading starting position in the perpendicular direction relative to the target parking position is too short. Thus, in this case, the effective path from the leading starting position at the time to the target parking position is not generated, thus the parking assist control cannot be conducted, and the parking space frame S on the screen of the touch display 16 is colored in red, or the like, thereafter.

On the other hand, in case the X coordinate of the terminal end position on the prediction locus does not exceed the "zero" of the X coordinate position of the target parking position as shown in FIG. 6A, that is, when it is positive value or zero, it is judged that the steering angle for generating the effective leading path to the target parking position exists between the zero steering angle and the maximum allowable steering angle because the distance of the leading starting position in the perpendicular direction relative to the target parking position is sufficiently long. Accordingly, in this case, in order to achieve the steering angle for generating the effective leading path to the target parking position by determining the steering angle initial value at the leading starting position at the time, for example, the voice guidance saying "turn the wheel to the left (or the right)" is outputted from the speaker 19 to suggest the operator the steering operation upon stopping the vehicle at the leading starting position.

The voice guidance is outputted based on the positional relationship between the leading starting position and the target parking position. That is, the voice guidance assumes "turn the wheel to the left" in case the target parking position is at the rear-leftward of the vehicle and it assumes "turn the wheel to the right" in case the target parking position is at the rear-rightward position of the vehicle.

After the foregoing voice guidance, the operator steers the wheel in the direction following the voice guidance upon the vehicle stopped at the leading starting position. The calculation of the leading path from the leading starting position to the target parking position is conducted every predetermined time (e.g., 2 ms) thereafter determining the actual steering angle of the vehicle as the steering angle initial value. In this case, the leading path is calculated for appropriately forming each interval including the following in order: 1. Normal turning interval at the actual steering angle; 2. Decreasing steering angle interval by Clothoid curve; 3. Straight reversing interval.

In case the effective leading path is not generated by the calculation and cannot be found, the inside of the parking space frame S is colored in red, or the like, on the screen of the touch display 16 to show that the parking assist control cannot be operated, and the arrow button switch C and the confirmation button switch K are continued to be displayed for suggesting a change of the starting position or the change of the target parking position. In case the effective leading path is generated by the calculation and found as shown in FIG. 5, the inside of the parking space frame S is colored in green, or the like, to show that the parking assist control can be performed.

In case the operator recognizes that the inside of the parking space frame S on the screen of the touch display 16 is colored in green, or the like, during the steering operation of the vehicle upon the vehicle stopped state following the voice guidance, the operator stops steering operation to maintain the steering angle. Thereafter, when the confirmation button switch K provided on the screen of the touch display 16 is operated in order to complete the designation of the target parking position with the foregoing state to reverse the vehicle by releasing the braking operation, the parking assist control is carried out for leading the vehicle to the target parking position along the effective leading path. In this case, the vehicle is automatically steered from the actual steering angle at the leading starting position in accordance with the reverse motion.

In case the effective leading path to the target parking position cannot be generated due to the continuation of the steering operation upon the vehicle stopped state despite the parking space frame S being colored in green during the steering operation by the operator upon the vehicle stopped state, the voice guidance such as "turn the wheel to the right (or left)" or "Return the wheel" is generated from the speaker 19 to suggest to the operator a steering operation to decrease the steering angle of wheels upon the vehicle stopped state. Thereafter, in case the effective leading path to the target parking position can be generated due to the steering operation following the voice guidance to decrease the steering angle of the wheels, the inside of the parking space frame S is colored in green, or the like, again.

The operator stops the steering operation to maintain the steering angle when recognizing that the parking space frame S is colored in green, or the like, during the steering operation to decrease the steering angle of the wheels following the guidance. Likewise at the steering operation to increase the steering angle of the wheels, after the designation of the target parking position is completed and the vehicle is reversed by releasing the braking operation, the parking assist control is carried out for leading the vehicle to the target parking position along the effective leading path.

With the parking assist device 10, the leading path from the leading starting position to the target parking position is calculated using the neutral positional state with the zero steering angles as the steering angle initial value first. In case the leading path based on the steering angle initial value with the zero steering angle is not effectively generated, next, the leading path from the leading starting position to the target parking position is calculated using the different steering angle from the zero steering angle as the steering angle initial value. With the different steering angle initial value, the region for generating the effective leading path to the target parking position differs. Particularly, in case the steering angle initial value is at the maximum allowable steering angle, the distance in the perpendicular direction of the leading starting position relative to the target parking position can be shorter than the case that the steering angle initial value is at the neutral positional state for generating the effective leading path.

Thus, with the construction of the parking assist device according to the embodiment of the present invention, the probability that the effective leading path is generated assumes higher than the construction that the only neutral positional state with the zero steering angle is used as the steering angle initial value for calculating the leading path form the leading starting position to the target parking position, and the range of the leading starting position for parking the vehicle to the target parking position is expanded. Accordingly, the positional limitation between the target parking position and the leading starting position is modified for generating the effective leading path, which is preferable for designating the target parking position and for determining the leading starting position.

Figure 7:
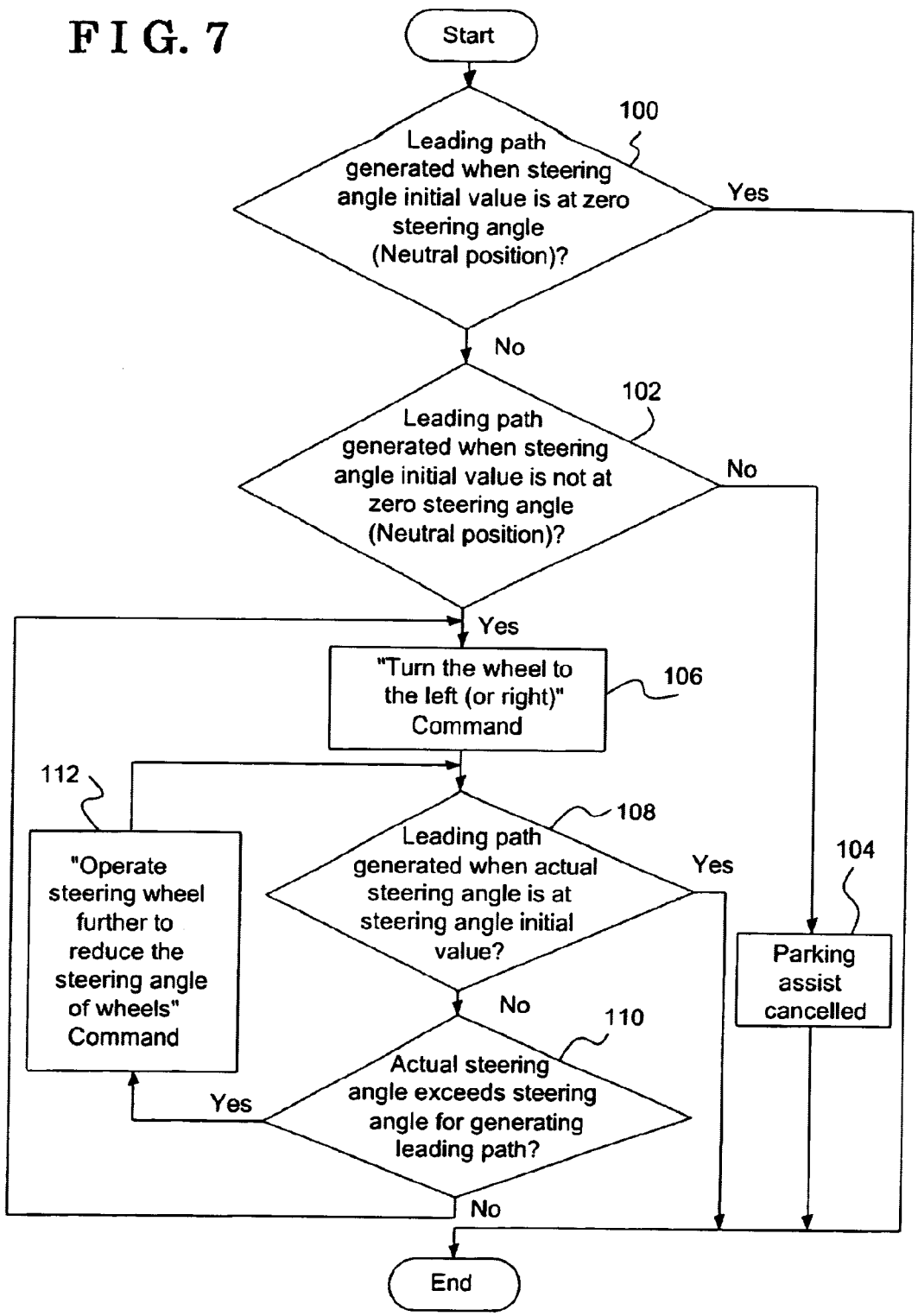
FIG. 7 is a flowchart of a control routine carried out at the parking assist device according to the embodiment of the present invention.

FIG. 7 shows a flowchart of an example of the control routine carried out for designating the target parking position at the back in parking mode with the parking assist ECU 12. The routine shown in FIG. 7 is repeatedly activated as the completion of the transaction. When the routine shown in FIG. 7 is activated, the transaction at Step 100 is carried out.

At Step 100, it is judged whether the effective leading path from the leading starting position to the target parking position is generated by the calculation in case the neutral positional state with the zero steering angles is used as the steering angle initial value. In case of the positive judgment, the routine is completed without any transaction because the effective leading path is generated. On the other hand, in case of the negative judgment, the transaction at Step 102 is carried out.

At Step 102, whether the effective leading path from the leading starting position to the target parking position is generated by the calculation in case the steering angle different from the zero steering angle is used as the steering angle initial value. With the transaction of Step 102, first, the prediction locus of the vehicle from the leading starting position to the position where the vehicle assumes in parallel with the target parking position when the maximum allowable steering angle is used as the steering angle initial value is calculated, and it is judged whether the terminal end position of the prediction locus exceeds the vehicle width directional position of the target parking position. In case the negative judgment is obtained, the transaction at Step 104 is carried out to cancel the parking assist control, and to complete the routine. On the other hand, in case of the positive judgment, the transaction at Step 106 is carried out.

At Step 106, the manual steering operation upon the vehicle stopped state by the operator is suggested by the voice guidance saying, for example, "turn the wheel to the left (or the right)" by operating the speaking 19. When the transaction at Step 106 is completed, the transaction at Step 108 is carried out.

At Step 108, it is judged whether the effective leading path from the leading starting position to the target parking position is generated by the calculation in case the actual steering angle at the time of the vehicle which is possibly started with the steering operation upon the vehicle stopped state by the operator as the steering angle initial value. In case of the positive judgment, the routine is completed without any other transaction because the effective leading path is generated. On the other hand, in case of the negative judgment, the transaction at Step 110 is carried out.

At Step 110, it is judged whether the actual steering angle at the time of the vehicle exceeds the predetermined steering angle for generating the effective leading path. In case it is judged that the actual steering angle has not exceeded the steering angle for generating the effective leading path, the transaction at Step 106 is carried out again for suggesting the further steering operation upon the vehicle stopped state because it is judged that the effective leading path has not generated yet. On the other hand, in case it is judged that the actual steering angle exceeds the predetermined steering angle, the transaction at Step 112 is carried out for suggesting the steering operation for decreasing the steering angle (i.e., returning the steering wheel) upon the vehicle stopped state because it is judged that the effective leading path is not generated at the time despite the once generated leading path.

At Step 112, the voice guidance saying "Return the steering wheel (i.e., Operate the steering wheel to decrease the steering angle of the wheel)" is outputted via the speaker 19 to suggest the operator the steering operation for decreasing the steering angle of the wheels upon the vehicle stopped state. After the completion of the transaction at Step 112, the transaction at Step 108 is carried out again.

According to the routine shown in FIG. 7, the calculation of the leading path from the leading starting position to the target parking position can be conducted using the neutral positional state with the zero steering angle as the steering angle initial value and also using the steering angle different from the zero steering angle as the steering angle initial value in case the leading path cannot be generated by using the zero steering angle as the steering angle initial value. Thus, with the parking assist device 10, the probability to generate the effective leading path can be increased without changing the leading starting position and the target parking position compared to the construction in which the leading path from the leading starting position to the target parking position is calculated only using the neutral positional state with the zero steering angle as the steering angle initial value, which expands the range of the leading starting position for parking at the target parking position. With this regard, because the positional limitation between the target parking position and the leading starting position is modified for generating the effective leading path, it is favorable for determining the leading starting position or designating the target parking position.

With the parking assist device according to the embodiment of the present invention, the judgment whether the effective leading path from the leading starting position to the target parking position is generated using the steering angle different from the zero steering angle as the steering angle initial value is conducted based on the positional relationship between the target parking position and the prediction locus in case the maximum allowable steering angle is used as the steering angle initial value. When the foregoing positional relationship satisfies the predetermined conditions, the steering angle for generating the effective leading path to the target parking position always exists between the zero steering angle and the maximum allowable steering angle. On the other hand, in case the foregoing positional relationship does not satisfy the predetermined conditions, the effective leading path is not generated even if the steering angle between the zero steering angle and the maximum allowable steering angle is determined as the steering angle initial value.

Accordingly, in case the foregoing positional relationship does not satisfy the predetermined conditions, the judgment whether the effective leading path is generated when the particular steering angle between the zero steering angle and the maximum allowable steering angle is determined as the steering angle initial value is not necessary because the positive judgment is not generated. Thus, with the parking assist device 10, the load for the calculation is reduced for judging whether the effective leading path is generated.

Further, although whether the effective leading path is generated when the steering angle different from the zero steering angle is determined as the steering angle initial value is informed to the operator by displaying the parking space frame S on the screen of the touch display 16 and by the voice guidance from the speaker 19 with the parking assist device according to the embodiment of the present invention, instead of the voice guidance, or additional to the voice guidance, the information may be displayed on the touch display. The steering angle initial value for generating the effective leading path is achieved by the steering operation upon the stopped state of the vehicle or by the steering operation for decreasing the steering angle of the wheels to the steering angle initial value. Thus, with the parking assist device 10, the vehicle is led along the securely effective leading path from the leading starting position to the target parking position by the parking assist control.

In the foregoing embodiment, the transaction of Step 100 in the routine shown in FIG. 7 by the parking assist ECU 12 serves as a leading path generation judging means and a first judging means, the transaction at Step 102 serves as the leading path generation judging means and a second judging means, the transaction at Step 106 serves as a steering direction means, and the transaction at Step 112 serves as a steering operation direction means for decreasing the steering angle of the wheels.

Although only the automatic steering operation using the electric motor of the EPS 18 is conducted as the parking assist control for moving the vehicle to the target parking position along the path in the foregoing embodiment, the actuation and the stop of the vehicle may be automatically conducted without the manual operation by the operator, and further, the manual operation by the operator may be assisted by displaying the additional lines on the screen of the touch display 16 or by the voice guidance.

Although the steering operation by the operator upon the stopped state of the vehicle is suggested by the voice guidance via the speaker 19 in order to achieve the steering angle for generating the effective leading path to the target parking position as the steering angle initial value at the leading starting position, the vehicle may be automatically steered upon the stopped state of the vehicle by directly actuating the electric motor of the EPS 18 without the manual operation by the operator.

Although the adjustment for the positional designation of the target parking position is conducted by the operation of the arrow button switch C with the embodiment of the present invention, the adjustment of the positional designation of the target parking position may be disabled after starting the steering wheel operation for changing the steering initial value to the desired steering angle by the operator. This is because in case the target parking position is adjusted upon of steered operation of the vehicle, it is required to judge whether the leading path based on the steering angle initial value of the zero steering angle is generated from the state and whether the leading path based on the steering angle initial value other than the zero steering angle, which complicates the calculation of the leading path. The inability of the adjustment of the target parking position may be determined to be effective only at the initial setting of the target parking position and may be ineffective at the resetting.

Further, although the available range of the leading starting position for the parking to the target parking potion at the back in parking is expanded with the embodiment of the present invention, in case the leading path to the target parking position at the parallel parking is not configured to be the tangential two circles, but is formed in order of the increasing steering angle interval, the normal turning interval, and the decreasing steering angle interval likewise the leading path of the back in parking, the calculation method can be applicable to the calculation for the leading path of the parallel parking.

Although the neutral positional state with the zero steering angle serves as an initial steering angle in the embodiment of the present invention, the actual steering angle of the vehicle at the leading starting position may serve as the initial steering angle.

According to the embodiment of the present invention, in case it is judged that the effective leading path is not generated to the target parking position upon the use of the initial steering angle as the steering angle initial value, it is judged whether the effective leading path to the target parking position is generated upon the use of the steering angle different from the initial steering angle as the steering angle initial value. The vehicle can be led to the target parking position when the leading path is generated by the foregoing judgment. Thus, with the construction of the parking assist device according to the embodiment of the present invention, the probability that the effective leading path is generated from the same position is increased compared to the construction using only the initial steering angle as the steering angle initial value, which expands the range of the leading starting position for parking the vehicle to the target parking position.

According to the embodiment of the present invention, the initial steering angle is the predetermined steering angle determined at the start of the parking assist operation such as the neutral positional state with the zero steering angle, the actual steering angle of the vehicle, or the like.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A parking assist device comprising:
   a leading path generating means for generating a leading path to a target parking position,
   a control means for performing a parking assist control which leads a vehicle to the target parking position based on the leading path; and
   a leading path generation judging means for judging whether the leading path to a target parking position is generated, including:
   a first judging means for judging whether the leading path is generated by using an initial steering angle of the vehicle determined as a steering angle initial value; and
   a second judging means for judging whether the leading path is generated by using a steering angle other than the initial steering angle determined as a steering angle initial value in case it is judged that the leading path is not generated by the first judging means.

2. The parking assist device according to claim 1, further comprising:
   a steering direction means for instructing steering operation to the steering angle other than the initial steering angle in case it is judged that the leading path is generated by the second judging means by using the steering angle other than the initial steering angle determined as the steering angle initial value after it is judged that the leading path is not generated by the first judging means by using the initial steering angle of the vehicle determined as the steering angle initial value.

3. The parking assist device according to claim 2, wherein the steering direction means provides an instruction to an operator of a steering operation to the steering angle other than the initial steering angle.

4. The parking assist device according to claim 3 further comprising:
   a steering operation direction means to decrease the steering angle of the vehicle instructing that the operator return the steering angle to correspond to the leading path in case the vehicle is oversteered relative to the leading path.

5. The parking assist device according to claim 4, wherein leading path generation judging means detects the steering angle; and the steering operation direction means decreases the steering angle of the vehicle in case the detected steering angle exceeds the steering angle used for generating the leading path.

6. The parking assist device according to claim 3, wherein the leading path generating means generates an instruction of a steering operation to an operator, and the generated instruction is outputted by a speaker.

7. The parking assist device according to claim 1, wherein the initial steering angle is at a neutral positional state; and the second judging means judges whether the leading path is generated on the basis of a steering angle, which is within a range from the neutral positional state to a maximum positional state including the maximum positional state, different from the initial steering angle on the basis of a positional relationship between the target parking position and a locus using a maximum allowable steering angle of the vehicle as the steering angle initial value.

8. The parking assist device according to claim 1 further comprising a steering direction means, wherein
  the steering direction means gives an instruction of a steering operation to an operator in case the steering angle is other than a steering angle at a neutral position and the leading path can be generated.

9. The parking assist device according to claim 1, wherein the parking assist control is canceled in case the leading path is not generated.

10. The parking assist device according to claim 1, further comprising a steering direction means; wherein
  the leading path generation judging means detects the steering angle; and
  the steering direction means gives an instruction of a steering operation to an operator in case the leading path is not generated by using the detected steering angle determined as the steering angle initial value.

11. A parking assist device, which includes a leading path generating means for generating a leading path to a target parking position, comprising:
  a leading path generation judging means for judging whether the leading path to a target parking position is generated; and
  a control means performing parking assist control for leading a vehicle to the target parking position based on the leading path generating means; wherein
  the leading path generation judging means includes:
  a first judging means for judging whether the leading path is generated by using an initial steering angle, which is a neutral position state, of the vehicle determined as a steering angle initial value; and
  a second judging means for judging whether the leading path is generated by using a steering angle other than the initial steering angle determined as the steering angle initial value in case it is judged that the leading path is not generated by the first judging means.

12. A parking assist device, which includes a leading path generating means for generating a leading path to a target parking position, comprising:
  a leading path generation judging means for judging whether the leading path to a target parking position is generated; and
  a control means performing parking assist control for leading a vehicle to the target parking position by the leading path generating means; wherein
  the leading path generation judging means includes:
  a first judging means for judging that the leading path is generated on by using an initial steering angle of wheels of the vehicle; and
  a second judging means for judging whether the leading path is generated by using a steering angle other than the initial steering angle determined in case it is judged that the leading path is not generated by the first judging means.

* * * * *